United States Patent
Cunniff et al.

(10) Patent No.: US 6,476,806 B1
(45) Date of Patent: Nov. 5, 2002

(54) METHOD AND APPARATUS FOR PERFORMING OCCLUSION TESTING WHILE EXPLOITING FRAME TO FRAME TEMPORAL COHERENCE

(75) Inventors: Ross Cunniff; Howard D. Stroyan; Norman Gee, all of Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/292,906

(22) Filed: Apr. 16, 1999

(51) Int. Cl.[7] .............................................. G06T 17/00

(52) U.S. Cl. ....................................... 345/421; 345/626

(58) Field of Search ................................. 345/418, 419, 345/420, 421, 422, 423, 619, 620, 622, 623, 624, 626

(56) References Cited

U.S. PATENT DOCUMENTS

| | | | |
|---|---|---|---|
| 5,751,291 A | 5/1998 | Olsen et al. ................. | 345/422 |
| 5,757,321 A | 5/1998 | Billyard ...................... | 345/434 |
| 6,088,035 A | 7/2000 | Sudarsky et al. ........... | 345/421 |
| 6,246,415 B1 | 6/2001 | Grossman et al. .......... | 345/422 |

Primary Examiner—Cliff N. Vo (57) ABSTRACT

A method and apparatus is provided for performing occlusion testing in a computer graphics display system. The apparatus comprises logic configured to determine whether or not an object of a current image frame was occluded in a previous image frame. If a determination is made that the object was not occluded in the previous image frame, then the logic causes the object of the current image frame to be rendered to a frame buffer of the computer graphics display system. The current and previous image frames are each comprised of a plurality of objects, and the logic determines whether or not each of the objects of the current image frame were occluded in the previous image frame. The logic causes any objects of the current image frame that were not occluded in the previous image frame to be rendered to the frame buffer. Once all of the objects of the current image frame that were not occluded in the previous image frame have been rendered to the frame buffer, the logic determines whether or not any of the rendered objects of the current image frame are occluded. If the logic determines that a particular rendered object of the current image frame is not occluded, the logic determines whether or not the particular object was occluded in the previous image frame. If so, then the logic determines that a prediction error has occurred because the object was not rendered even though it is visible. In accordance with a first embodiment of the present invention, when the logic determines that a prediction error has occurred, it causes the visible object to be rendered to the frame buffer to correct the error. In accordance with a second embodiment of the present invention, the logic waits until all of the objects have been tested and then causes all of the visible objects to be rendered to the frame buffer.

38 Claims, 4 Drawing Sheets

METHOD AND APPARATUS FOR PERFORMING OCCLUSION TESTING WHILE EXPLOITING FRAME TO FRAME TEMPORAL COHERENCE

TECHNICAL FIELD OF THE INVENTION

The present invention relates to computer graphics display systems and, more particularly, to a method and apparatus for performing occlusion culling operations in a computer graphics display system while exploiting frame-to-frame temporal coherence.

BACKGROUND OF THE INVENTION

In three-dimensional images (3-D) computer graphics display systems, it is necessary to prevent pixels from being displayed on the display monitor if the pixels of a primitive will cause pixels that are closer to the viewer of the scene to be blocked, or occluded. In 3-D images, each pixel has a depth associated with it, normally referred to as the Z coordinate, which relates to the distance of the pixel from the screen of the display monitor. Several known techniques have been developed and implemented to ensure that pixels that are closer to the screen of the display monitor are not occluded by pixels that are further away from the screen of the display monitor.

Hidden Surface Removal (HSR) corresponds to a class of occlusion culling techniques that are used for this purpose. One well known HRS technique transforms all graphics primitives (e.g., triangles) from object coordinate space into a viewing, or screen, coordinate space. The resulting screen coordinate primitives are then "rasterized". The process of rasterization involves scanning a "footprint" (i.e., color and depth) of each primitive into a frame buffer on a line-by-line, pixel-by-pixel basis. The primitives to be rasterized exist in 3-D space where the X and Y coordinates are aligned with the rows and columns of the screen and the Z coordinate is a depth axis that is perpendicular to the screen.

The frame buffer is comprised in the graphics hardware and is comprised of an image buffer and a depth buffer. The pixel colors are stored in the image buffer and the Z coordinates associated with the pixels are stored in the depth buffer. The depth buffer is used to sort the primitives on a pixel-by-pixel basis to determine, for each pixel, which primitive is closest the screen and, therefore, visible. Only the pixels that are visible are displayed in the final image.

One of the shortcomings of this technique is that all primitives that fall within the X and Y bounds of the screen are rasterized on a pixel-by-pixel basis, even though many of the pixels will not be contained in the final image displayed on the display monitor. Rasterizing each pixel requires a significant amount of processing time and resources. Various occlusion culling techniques have been developed to reduce the number of primitives which must be transformed and rasterized.

Another known HRS technique that is utilized for performing occlusion culling is front-to-back sorting of primitives. The success of an occlusion culling technique is a function of the number of valid occlusion results produced via the technique verses not being able to determine with certainty that a primitive being tested is occluded even though the primitive will be occluded in the final scene. If, during the occlusion check, an attempt is made to occlusion test an object whose occluder(s) have not yet been rendered, the object will appear visible in the occlusion test, even if it will be occluded in the final scene. Front-to-back sorting of primitives increases the likelihood that a potentially occluding object will be rendered before rendering an object that may be occluded by the potentially occluding object.

One of the shortcomings of this front-to-back sorting technique is that the objects must be sorted for each frame since the order of the frames may change as a function of the viewing angle or as a function of the relative position of the objects. This sorting results in substantial processing overhead in the image rendering process.

Other occlusion culling techniques involve identifying entire groups of primitives, sometimes referred to as bounding boxes or volumes, that will not appear in the final image, and excluding those groups from the rendering process. Since these primitives are "occluded" in the final image, they may be omitted from the rendering process with no impact on the resulting final image.

Variations on the typical bounding box occlusion culling technique have also been proposed. For example, techniques have been proposed which utilize a recursive hierarchy of objects in order to reduce the number of occlusion checks that must be performed. An example of an object hierarchy is a wheel, which comprises a rim, which comprises a hub, etc. If the wheel will be occluded, the rim and hub will also be occluded. If the wheel is not fully occluded, but the rim will be occluded, the hub will also be occluded.

In accordance with this technique, a bounding box is created which encloses all of the primitives in the object. The graphics hardware then performs Z depth comparison tests by comparing the Z values of the bounding box primitives against the Z values stored in the depth buffer. Software being executed by the host processor of the computer graphics display system uses the results of the Z depth comparison tests to determine whether any pixel in the frame buffer would be modified if the bounding box were rendered. If a determination is made that no pixels would be modified if the bounding box is rendered, then the object can be considered occluded and, therefore, it need not be rendered.

All of these occlusion culling techniques require the graphics pipeline to be turned around from a rendering mode to an occlusion testing mode, and vice versa, relatively often. This turn around time is expensive and is accrued on a per-object basis. Each turn around of the graphics pipeline is costly in terms of the number of states required for the turn around and, consequently, decreases processing throughput.

Accordingly, a need exists for an occlusion culling technique which reduces the overall number of pixels that must be rasterized by reducing the number of false positive visibility results, which eliminates the need for front-to-back sorting, and which minimizes the frequency with which the graphics pipeline must be switched between the rendering mode and the testing mode.

SUMMARY OF THE INVENTION

The present invention provides a method and apparatus for performing occlusion testing in a computer graphics display system. The apparatus comprises logic configured to determine whether or not an object of a current image frame was occluded in a previous image frame. If a determination is made that the object was not occluded in the previous image frame, then the logic causes the object of the current image frame to be rendered to a frame buffer of the computer graphics display system.

The current and previous image frames are each comprised of a plurality of objects, and the logic determines whether or not each of the objects of the current image frame were occluded in the previous image frame. The logic causes any objects of the current image frame that it determines were not occluded in the previous image frame to be rendered to the frame buffer. Once all of the objects of the current image frame that were not occluded in the previous image frame have been rendered to the frame buffer, the logic determines whether or not any of the rendered objects of the current image frame are occluded. If the logic determines that a particular rendered object of the current image frame is not occluded, the logic determines whether or not the particular object was occluded in the previous image frame. If so, then the logic determines that a prediction error has occurred. In accordance with a first embodiment of the present invention, when the logic determines that a prediction error has occurred, it causes the particular object to be rendered to the frame buffer to correct the error.

The logic determines whether or not any objects in the current image frame are occluded by performing an occlusion test on each of the objects in the current image frame. The occlusion tests can be performed in serial fashion, one object at a time, or they may be performed on all of the objects of a given frame in parallel, i.e., simultaneously. If the logic determines during the occlusion test that an object is occluded, it marks the occluded object with a first indicator indicating that the marked object is occluded. If, during the occlusion test, the logic determines that an object in the current image frame is not occluded, then it determines whether or not the object has previously been marked with the first indicator. If the logic determines that the object which is not occluded in the current image frame has previously been marked with the first indicator, then it marks the object with a second indicator indicating that the object is visible. The logic then causes the visible object to be rendered to the frame buffer.

In accordance with a second embodiment of the present invention, the logic waits until all of the objects of a given image frame have been occlusion tested and then causes all of the objects that have been marked as being visible to be rendered to the frame buffer. This prevents the graphics pipeline from being turned around from the occlusion testing mode to the rendering mode each time the logic determines that a prediction error has occurred. Other features and advantages of the present invention will become apparent from the following discussion, drawings and claims.

DETAILED DESCRIPTION OF THE INVENTION

Figure 1:
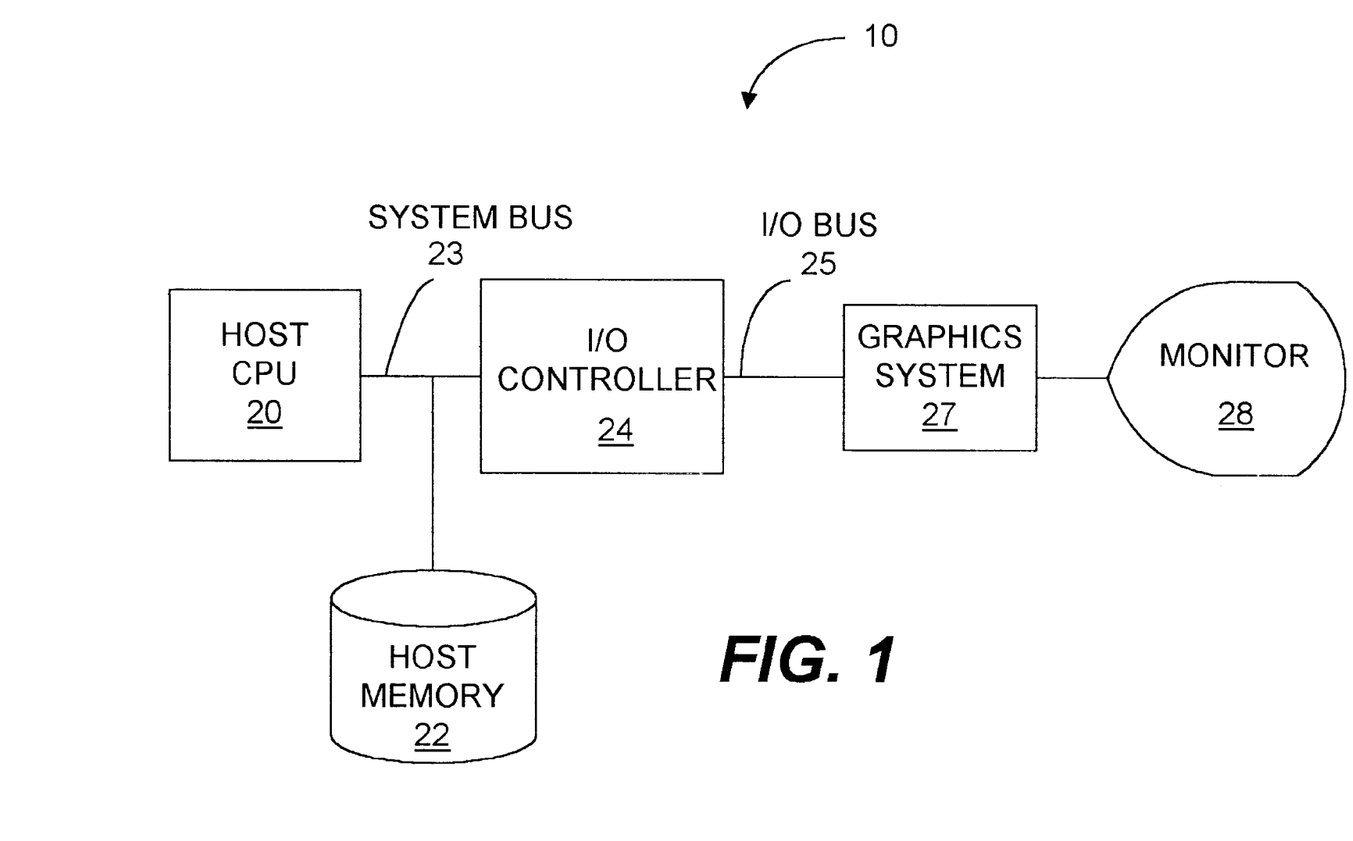
FIG. 1 is a block diagram of a computer graphics display system suitable for implementing the present invention.

FIG. 1 is a block diagram of a computer graphics display system 10 which incorporates the method and apparatus of the present invention. The computer graphics display system 10 comprises a host CPU 20, a host memory device 22, a system bus 23, an input/output (I/O) controller 24, and I/O bus 25, a graphics system 27, and a monitor 28 for displaying graphics information output from the graphics system 27.

The host CPU 20 processes input received from the console (not shown) of the computer graphics display system 10 and outputs commands and data over the system bus 23 to the I/O interface controller 24. The I/O interface controller 24 formats the commands and data utilizing the protocols of the I/O bus 25, which preferably is a Peripheral Component Interconnect (PCI) bus. The information received over the I/O bus 25 is input to the graphics system 27. The graphics system 27 then processes this information and causes graphics images to be displayed on the monitor 28.

Figure 2:
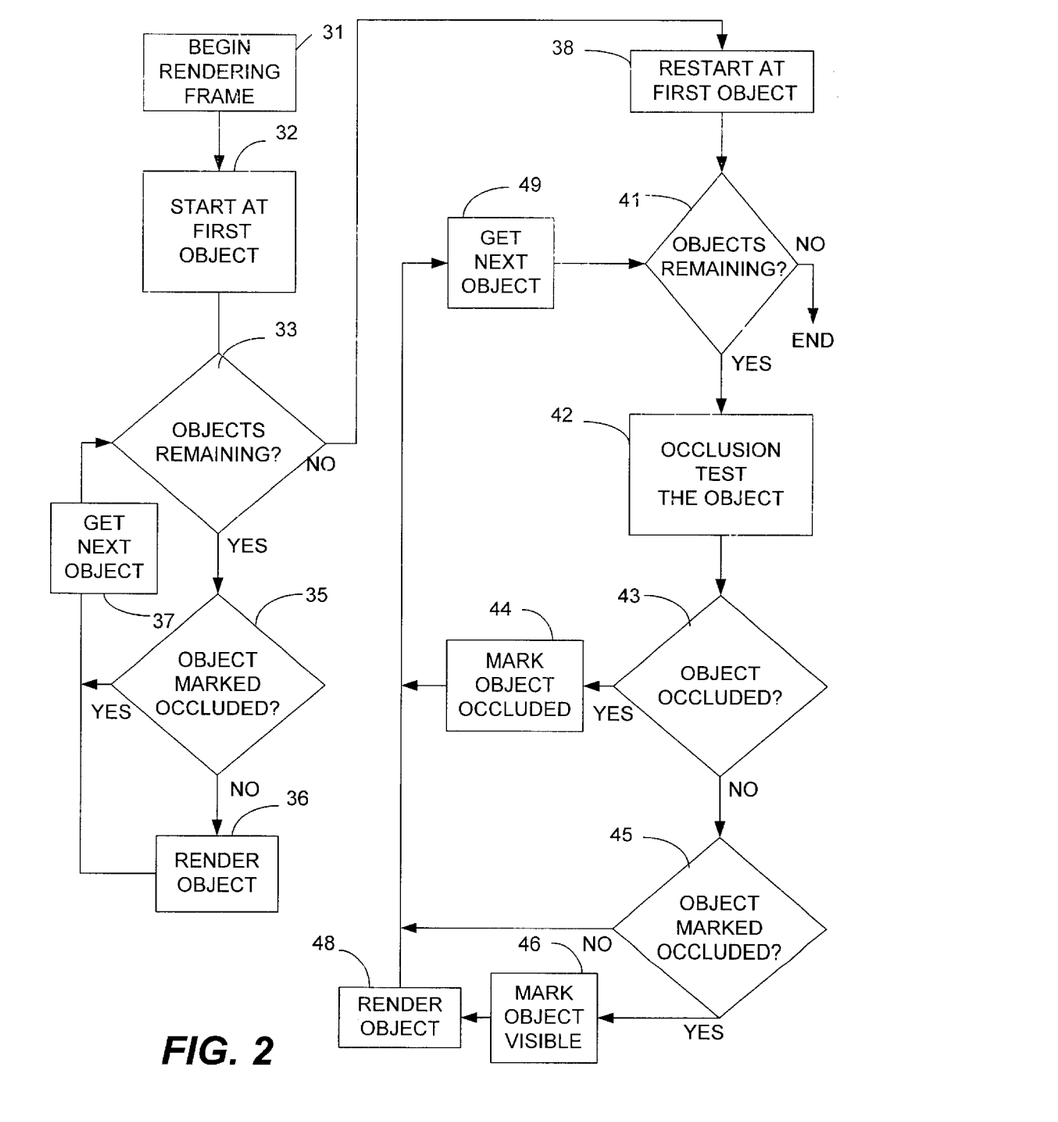
FIG. 2 is a flow chart demonstrating the method of the present invention for performing occlusion culling in accordance with a first embodiment.

FIG. 2 is a flow chart demonstrating the occlusion culling method of the present invention in accordance with a first embodiment. The occlusion culling method of the present invention preferably is performed by the host CPU 20 which is configured to execute an occlusion culling program. The occlusion culling method being performed by the host CPU 20 utilizes results of Z depth comparison tests performed by the graphics system 27. These results are read by the host CPU 20 from the graphics system 27. A variety of Z depth comparison algorithms are suitable for performing the Z depth comparison tests, as will be understood by those skilled in the art. The occlusion culling method of the present invention is not limited with respect to the type of Z depth comparison algorithm performed by the graphics system 27, as will be understood by those skilled in the art. Since Z depth comparison algorithms are generally understood by those skilled in the art, a detailed discussion of the manner in which such tests are performed will not be provided herein in the interest of brevity.

Suitable techniques for performing the Z depth comparison tests are disclosed in commonly assigned U.S. patent application Ser. Nos. 09/178,525, filed Oct. 23, 1998 and 09/042,291, filed Mar. 13, 1998. Preferably, the Z depth comparison algorithm performed by the graphics system 27 compares objects to the contents of the depth buffer (not shown) comprised in the graphics system 27 in a manner similar to the manner in which the occlusion culling techniques discussed in the Background of the Invention perform this task. However, in accordance with the present invention, it is not necessary to sort the objects from front-to-back, as is the case with the aforementioned occlusion culling techniques. Also, the order in which the Z depth comparison tests are performed is different from the order in which they are performed in the known occlusion culling processes, as will become apparent from the following discussion.

The present invention is premised on the concept of temporal coherency between images which are adjacent, or in close proximity, in time. In particular, in 3-D scenes wherein a 3D object is being imaged by a camera model, the position of the object relative to the position of the camera in the camera model typically changes very little from one frame to the next frame. It follows from this observation that the visibility of any object in a frame will have a strong correlation to the visibility of the object in both the previous frame and in the following frame.

The manner in which the present invention exploits these observations regarding temporal coherency will now be discussed in detail. Generally, if a determination is made that an object was not occluded in the previous frame, then the object is rendered, i.e., the object is drawn on the display monitor 28. If a determination is made that the object was occluded in the previous frame, then the object is not rendered, unless other determinations are subsequently made which dictate that the object should be rendered, as discussed below in more detail. Once all of the objects have been rendered, a determination is made as to whether or not the objects in the current frame were occluded and the results of this determination are saved so that they can be used in processing the next frame. Only those objects which were either occluded in the previous frame or which have not been occlusion tested recently need be checked for occlusion in the current frame. If the object is not occluded in the current frame, but was occluded in the previous frame, then a prediction error has occurred. The object is then rendered in order to eliminate the error.

At the beginning of the process shown in FIG. 2 (i.e., for the first image frame), it is assumed that all pixels are visible. Therefore, all of the pixels of the first image frame are rendered in the first pass through the algorithm of FIG. 2. After the first pass, occlusion results are available for testing the next image frame. The host CPU 20 then begins rendering the next frame of image data, as indicated by block 31. As stated above, the method of the present invention occlusion tests objects, which are each comprised of a series of primitives. These objects essentially are bounded volumes of primitives.

As indicated by block 32, the host CPU 20 begins at a first object of a group of objects which make up the current frame and determines, at block 33, whether any objects to be tested remain in the group. Assuming the host CPU 20 is evaluating the first object in the group, a determination will be made at block 33 that there are objects remaining in the group, and the process will proceed to block 35. A determination will then be made at block 35 as to whether or not the object being evaluated was marked as occluded when the occlusion test was performed on the previous frame. As stated above, the host CPU 20 will analyze the information contained in the database to determine whether or not the current object was marked as occluded in the previous frame. If so, the process will increment to the next object at the step represented by block 37 and then return to the step represented by block 33. If not, the process will proceed to block 36 and the object will be rendered.

Once the object is rendered, the process proceeds to the step represented by block 37 and the next object in the group of objects is obtained. The process then returns to the step represented by block 33 where a determination will be made as to whether or not any objects are remaining in the group which need to be evaluated. If so, the process will proceed to the step represented by block 35. This process will continue for all of the objects in the frame. When a determination is made at block 33 that there are no more objects remaining in the current frame, the process will proceed to the step represented by block 38 and the host CPU 20 will once again obtain the first object of the group of objects comprising the frame. The process will then proceed to the step represented by block 41 where a determination will be made as to whether or not any objects are remaining in the group which need to be evaluated.

Assuming that the group of objects contains objects which have not yet been evaluated, the process will proceed to the step represented by block 42 and the current object will be occlusion tested by the graphics system 27, i.e., a Z depth comparison test will be performed on the current object. Therefore, the values stored in the Z buffer of the graphics system 27 are compared with the Z values of the primitives comprising the bounded volume of the current object. It should be noted that the Z depth comparison test is being performed after the objects in the group that were not marked as occluded have already been rendered. As stated above, the manner in which this type of Z depth comparison test is performed is well-known to those skilled in the art.

Once the object has been occlusion tested, the process proceeds to the step represented by block 43 where a determination will be made as to whether or not the current object was occluded. If the current object was occluded, then the current object is marked with an indicator (e.g., a flag) which indicates that the object was occluded, as indicated by block 44. Therefore, if it is determined that the object is occluded, it will not be rendered and the process will proceed to block 49 and the next object will be obtained. The host CPU 20 will save information in the database indicating that this object has been marked as occluded.

If a determination is made at block 43 that the object is not occluded, the process will proceed to block 45 where a determination will be made as to whether or not the object had been previously marked with the indicator indicating that it was occluded. If the object had not been marked as occluded, the process will proceed to block 49 and the next object will be obtained. If the object had been previously marked as occluded, but is not actually occluded in the current frame, as determined at block 43, a prediction error has occurred and the error must be remedied. It should be noted that when this error occurs, this means that the assumption that an object that was occluded in the preceding frame will also be occluded in the current is incorrect with respect to the current object. In order to remedy the error, the process will proceed to the step represented by block 46 and the object will be marked as visible. The visible object will then be rendered, as indicated by block 48. The process will then proceed to the step represented by block 49 and the next object will be obtained. Assuming objects in the group remain to be processed, the next object in the group of objects will be processed.

It should be noted that the only time that the graphics pipeline will be turned around from the occlusion testing mode to the rendering mode is when a determination is made at block 45 that an object that has been found not to be occluded in the current frame and that the object was marked as occluded in the previous frame. Thus, the graphics pipeline is only switched between the occlusion testing mode and the rendering mode when a prediction error occurs. This results in a significant reduction in state turn-around. It should also be noted that this method eliminates the need to sort the objects from front to back before rendering them, as is done in typical occlusion testing algorithms, as described above in detail. This is due to the fact that the frame is rendered before it is occlusion tested and then "fixed" by rendering any previously-occluded objects which are now visible.

It should also be noted that although the flow chart of FIG. 2 indicates that the tasks of blocks 41–46, 48 and 49 are performed in serial fashion for each individual object, this is not necessarily the case. Those skilled in the art will understand that these steps can be performed in accordance with a batching technique which allows a plurality of objects to be processed in accordance with these steps in parallel. Those skilled in the art will understand the manner in which this can be accomplished.

Figure 3A:
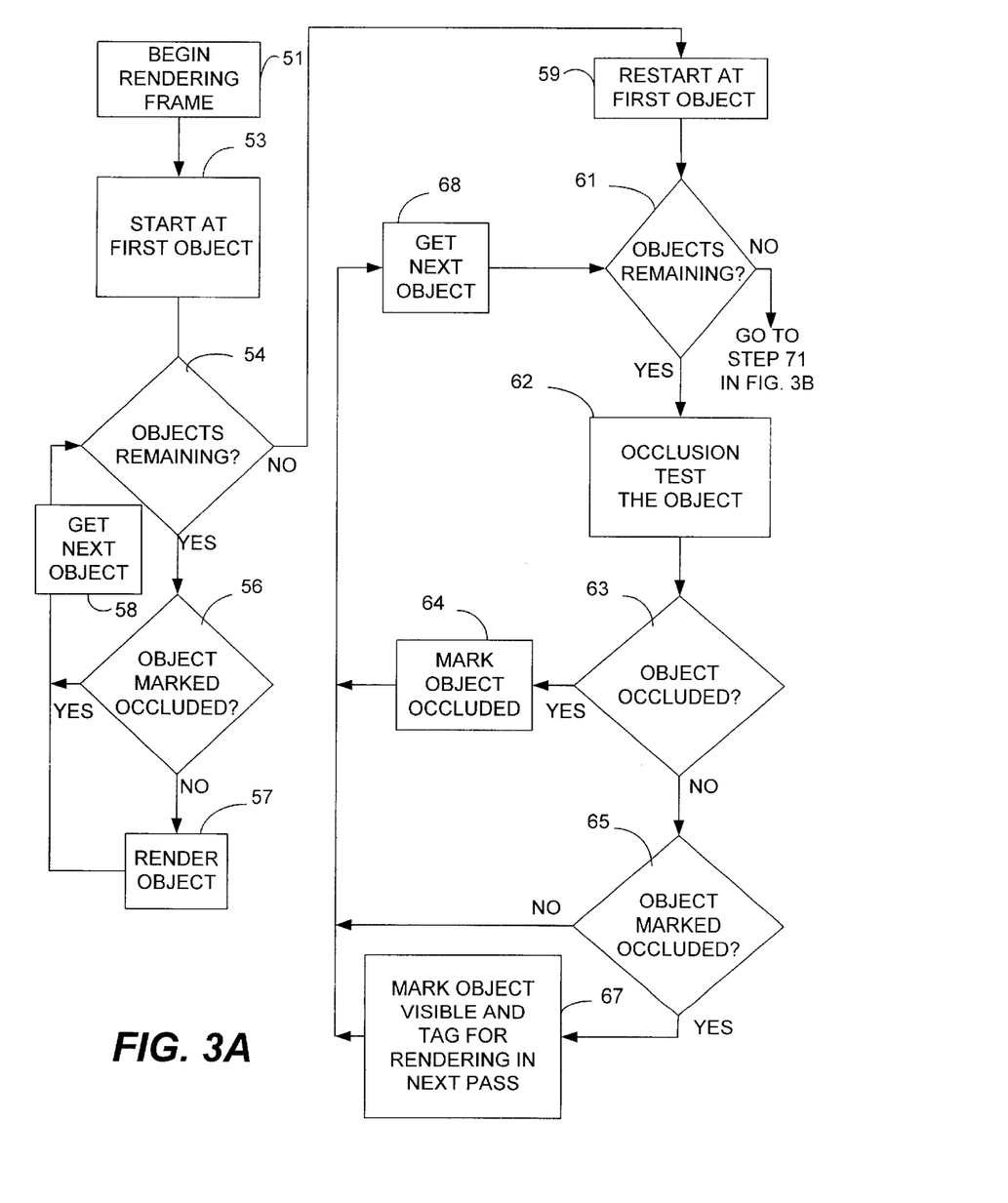
FIGS. 3A and 3B together represent a flow chart illustrating the method of the present invention in accordance with a second embodiment for performing occlusion culling.
Figure 3B:
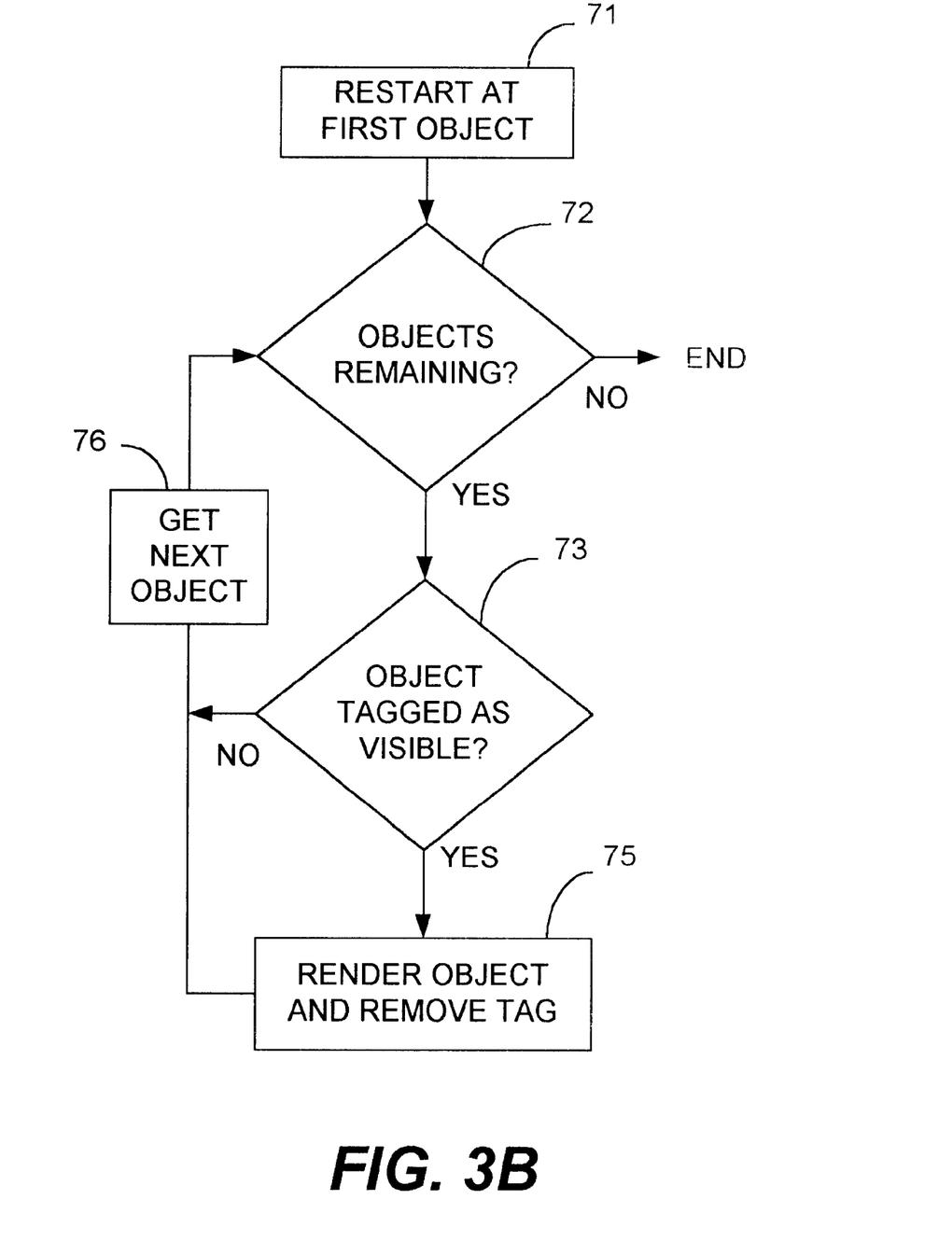

Although the method of the present invention shown in FIG. 2 ensures that the graphics pipeline will not be turned around from the occlusion testing state to the rendering state, and vice versa, unless a prediction error occurs, the method of FIG. 2 requires that the graphics pipeline be turned around whenever a prediction error does occur. FIGS. 3A and 3B together represent the occlusion culling method of the present invention in accordance with an alternative embodiment which further reduces the number of times the graphics pipeline must be turned around from an occlusion testing state to a rendering state, and vice versa. In accordance with the embodiment shown in FIGS. 3A and 3B, when an object that was marked as occluded in the previous frame is found to be visible in the current frame, the object is not immediately rendered. Rather, the object is tagged as being visible. Once all of the objects for the current frame have been occlusion tested, all of the objects that were tagged as being visible are rendered. Therefore, the graphics pipeline is only switched from the occlusion testing mode to the rendering mode once for the current frame and only if at least one prediction error occurred in the current frame. The manner in which this is accomplished will now be described with respect to FIGS. 3A and 3B.

As with the process shown in FIG. 2, at the beginning of the process shown in FIGS. 3A and 3B, it is assumed that all pixels are visible. Therefore, all of the pixels of the first image frame are rendered in the first pass through the algorithm of FIGS. 3A and 3B. After the first pass, occlusion results are available for testing the next image frame. The host CPU 20 then begins rendering the next frame of image data at block 51. The host CPU 20 begins at a first object of a group of objects which make up the current frame, as indicated by block 53, and determines whether any objects to be tested remain in the group, as indicated by block 54. Assuming the host CPU 20 has not finished evaluating all of the objects in the group, a determination will be made at block 54 that there are objects remaining in the group, and the process will proceed to block 56.

A determination will be made at block 56 as to whether or not the object being evaluated was marked as occluded when the occlusion test was performed on the previous frame. As stated above, the host CPU 20 will analyze the information contained in the database to determine whether or not the current object was marked as occluded in the previous frame. If so, the process will return to the step represented by block 58 and the next object will be obtained before returning to the step represented by block 54. If not, the process will proceed to block 57 and the object will be rendered. Once the object is rendered, the process proceeds to block 58 and the next object is obtained. The process then returns to the step represented by block 54 where a determination will be made as to whether or not any objects are remaining in the group which need to be evaluated. If so, the process will proceed to the step represented by block 56. This portion of the process represented by blocks 54, 56, 57 and 58 will continue for all of the objects in the frame.

When a determination is made at block 54 that there are no more objects remaining in the current frame, the process will proceed to the step represented by block 59 and the host CPU 20 will once again obtain the first object of the group of objects comprising the frame. The process will then proceed to the step represented by block 61 where a determination will be made as to whether or not any objects are remaining in the group which need to be evaluated. Assuming that the group of objects contains objects which have not yet been evaluated, the process will proceed to the step represented by block 62 and the current object will be occlusion tested by the graphics system 27, i.e., a Z depth comparison test will be performed on the current object. Therefore, the values stored in the Z buffer of the graphics system 27 are compared with the Z values of the primitives comprising the bounded volume of the current object. As with the embodiment of FIG. 2, the Z depth comparison test is being performed after the objects in the group that were not marked as occluded have already been rendered. As stated above, the manner in which this type of Z depth comparison test is performed is well-known to those skilled in the art.

Once the object has been occlusion tested, the process proceeds to the step represented by block 63 where a determination will be made as to whether or not the current object was occluded. If the current object was occluded, then the current object is marked with an indicator (e.g., a flag) which indicates that the object was occluded, as indicated by block 64. Therefore, if it is determined that the object is occluded, it will not be rendered. The process will then proceed to block 68 and the next object will be obtained. The process will then return to block 61. The host CPU 20 will save information in the database indicating that this object has been marked as occluded.

If a determination is made at block 63 that the object is not occluded, the process will proceed to block 65 where a determination will be made as to whether or not the object had been previously marked with the indicator indicating that it was occluded in the previous frame. If the object is not occluded in the current frame and if the object had not previously been marked as occluded, the process will proceed to the step represented by block 68 and the next object will be obtained. If the object had been previously marked as occluded, but is not actually occluded in the current frame, as determined at block 65, a prediction error has occurred, as discussed above in detail. However, instead of immediately switching from the occlusion testing mode to the rendering mode in order to render the visible object, as is done in the embodiment discussed above with reference to FIG. 2, the object will be tagged as a visible object and the process will proceed to block 68.

Once all of the objects in the current frame have been processed, as determined by the step represented by block 61, the process will proceed to the step represented by block 71 in FIG. 3B. The host CPU 20 will then begin at the first object in the current frame, as indicated by block 71, and will determine whether the objects have been tagged as being visible, as indicated by block 73. If so, the object will be rendered and the tag will be removed. The process will then proceed to block 76 and the next object will be obtained. The process will then return to the step represented by block 72. Once all of the objects that were tagged as visible have been rendered, a determination is made at block 72 that there are no more objects remaining to be rendered and the rendering process ends. Of course, as long as incoming frames remain to be processed through the graphics pipeline, the process of FIGS. 3A and 3B will continue.

It should also be noted that although the flow chart of FIGS. 3A and 3B indicates that the tasks of blocks 61–65, 67 and 68 are performed in serial fashion for each individual object, this is not necessarily the case. Those skilled in the art will understand that these steps can also be performed in accordance with a batching technique which allows a plurality of objects to be processed in accordance with these steps in parallel. Those skilled in the art will understand the manner in which this can be accomplished.

It should also be noted that the present invention is not limited to the embodiments described herein. Those skilled in the art will understand that modifications may be made to the embodiments discussed herein without deviating from the scope of the present invention. For example, although some of the occlusion culling tasks performed by the present invention are performed either by the graphics system 27 or by the host CPU 20, it will be understood by those skilled in the art that the present invention is not limited with respect to the location in the computer graphics display system 10 at which these tasks are performed. Also, those skilled in the art will understand that many of the tasks that are performed by the host CPU 20 in software can also be performed in hardware or in a combination of hardware and software. Similarly, many of the tasks that are performed in hardware by the graphics system 27 can instead be performed by the host CPU 20 in software or in a combination of hardware and software.

What is claimed is:

1. An apparatus for performing occlusion testing in a computer graphics display system, the apparatus comprising: logic configured to determine whether an object of a current image frame was occluded in a previous image frame, wherein when a determination is made that the object was not occluded in the previous image frame, then said logic causes the object of the current image frame to be rendered to a frame buffer of the computer graphics display system, wherein when said logic determines that the object of the current image frame was occluded in the previous image frame, then said logic causes the object of the current image frame not to be rendered to the frame buffer, wherein the current and previous image frames are each comprised of a plurality of objects, and wherein said logic determines whether each of the objects of the current image frame were occluded in the previous image frame, wherein said logic causes any objects of the current image frame that said logic determines were not occluded in the previous image frame to be rendered to the frame buffer, and wherein once all of the objects of the current image frame that said logic determines were not occluded in the previous image frame have been rendered to the frame buffer, said logic determines whether any of the objects of the current image frame that have been rendered are occluded, wherein when said logic determines that a particular rendered object of the current image frame is not occluded, said logic determines whether the particular object was occluded in the previous image frame, wherein when said logic determines that the particular object was occluded in the previous image frame, then said logic determines that a prediction error has occurred and said logic causes the particular object to be rendered to the frame buffer to correct the error.

2. The apparatus of claim 1, wherein said logic determines whether any objects in the current image frame are occluded by performing an occlusion test on each of the objects in the current image frame, wherein when said logic determines during the occlusion test that an object is occluded, said logic marks the occluded object with a first indicator indicating that the marked object is occluded, and wherein during the occlusion test, when said logic determines that an object in the current image frame is not occluded, then said logic determines whether the object that is not occluded in the current image frame has previously been marked with the first indicator, wherein when said logic determines that the object that is not occluded in the current image frame has previously been marked with the first indicator, then said logic marks the object with a second indicator indicating that the object is visible and causes the visible object to be rendered to the frame buffer.

3. The apparatus of claim 2, wherein said logic makes the determination as to whether objects for a given image frame are occluded simultaneously for all of the objects of the given image frame, and wherein said logic makes the determinations as to whether objects of the given image frame have been marked with a first indicator simultaneously for all of the objects of the given image frame and wherein said logic marks objects of a given image frame with the first indicator simultaneously for all objects of the given image frame and wherein said logic marks objects of a given image frame with the second indicator simultaneously for all objects of the given image frame.

4. The apparatus of claim 3, wherein said logic is partly implemented in hardware of the computer graphics display system and is partly implemented in a central processing unit of the computer graphics display system, wherein the occlusion tests are performed in the graphics hardware and wherein the determinations as to whether an object has been marked as occluded or visible are performed in the central processing unit of the computer graphics display system, wherein the central processing unit causes the objects which have not been marked as occluded to be rendered to the frame buffer, and wherein the central processing unit performs the tasks of marking objects as visible or occluded and of tagging visible objects to be rendered.

5. The apparatus of claim 1, wherein the current and previous image frames are each comprised of a plurality of objects, and wherein said logic determines whether each of the objects of the current image frame were occluded in the previous image frame, wherein said logic causes any objects of the current image frame that said logic determines were not occluded in the previous image frame to be rendered to the frame buffer, and wherein once all of the objects of the current image frame that said logic determines were not occluded in the previous image frame have been rendered, said logic determines whether any of the objects of the current image frame that have been rendered are occluded, wherein when said logic determines that a particular rendered object of the current image frame is not occluded, said logic determines whether the particular object was occluded in the previous image frame, wherein when said logic determines that the particular object was occluded in the previous image frame, then said logic determines that a prediction error has occurred and said logic marks the particular object as visible, wherein after said logic has occlusion tested all of the objects in the current image frame, said logic causes each visible object to be rendered.

6. The apparatus of claim 5, wherein said logic determines whether any objects in the current image frame are occluded by performing an occlusion test on each of the objects in the current image frame, wherein when said logic determines during the occlusion test that an object is occluded, said logic marks the occluded object with a first indicator indicating that the marked object is occluded, and wherein during the occlusion test, when said logic determines that an object in the current image frame is not occluded, then said logic determines whether the object that is not occluded in the current image frame has previously been marked with the first indicator, wherein when said logic determines that the object that is not occluded in the current image frame has previously been marked with the first indicator, then said logic marks the object with a second indicator indicating that the object is visible, wherein once all of the objects of the current image frame have been occlusion tested, said logic causes all of the tagged objects to be rendered to the frame buffer.

7. The apparatus of claim 6, wherein said logic is partly implemented in hardware of the computer graphics display system and is partly implemented in a central processing unit of the computer graphics display system, wherein the occlusion tests are performed in the graphics hardware and wherein the determinations as to whether an object has been marked as occluded or visible are performed in the central processing unit of the computer graphics display system, wherein the central processing unit causes the objects which have not been marked as occluded to be rendered to the frame buffer, and wherein the central processing unit performs the tasks of marking objects as visible or occluded and of tagging visible objects to be rendered to the frame buffer.

8. A method for performing occlusion testing in a computer graphics display system, the method comprising the steps of:

determining whether each object of a current image frame was occluded in a previous image frame;

when a determination is made that a particular object of the current image frame was not occluded in the previous image frame, rendering the particular object to a frame buffer of the computer graphics display system;

once all of the objects of the current image frame that were not occluded in the previous image frame have been rendered to the frame buffer, determining whether any of the objects of the current image frame that have been rendered are occluded;

when a determination is made that a particular object of the current image frame that has been rendered is not occluded, determining whether the particular object of the current image frame was occluded in the previous image frame; and when a determination is made that the particular object of the current image frame was occluded in the previous image frame, determining that a prediction error has occurred.

9. The method of claim 8, wherein when a determination is made that a prediction error has occurred, the particular object is rendered to the frame buffer to correct the error, and wherein the step of determining whether any objects in the current image frame that have been rendered are occluded is accomplished by performing an occlusion test on each of the objects in the current image frame, wherein when a determination is made during the occlusion test that an object in the current image frame is occluded, the occluded object is marked with a first indicator indicating that the marked object is occluded.

10. The method of claim 9, wherein the step of determining whether the particular object of the current image frame was occluded in the previous image frame is performed by determining whether the object is marked with the first indicator.

11. The method of claim 8, wherein when a determination is made that a prediction error has occurred, the particular object is rendered to correct the error, and wherein the step of determining whether any rendered objects in the current image frame are occluded is accomplished by performing an occlusion test on each of the objects in the current image frame, wherein when a determination is made during the occlusion test that an object in the current image frame is occluded, the occluded object is marked with a first indicator indicating that the marked object is occluded, and wherein the step of determining whether the particular object of the current image frame was occluded in the previous image frame is performed by determining whether the object is marked with the first indicator, and wherein when a determination is made that a particular object that is not occluded in the current image frame has been marked with the first indicator, then the object is marked with a second indicator indicating that the object is visible and tagged with a tag indicating that the object is to be drawn on the display monitor, wherein each tagged object corresponds to the occurrence of a prediction error, and wherein once all of the objects of the current image frame have been occlusion tested, all of the tagged objects are rendered to the frame buffer.

12. A computer program embodied on a computer-readable medium, the computer program corresponding to an occlusion culling algorithm for performing occlusion culling in a computer graphics display system, the program comprising:

a first code segment which determines whether each object of a current image frame was occluded in a previous image frame;

a second code segment which renders the particular object to a frame buffer of the computer graphics display system, wherein the second code segment renders the particular object of the current image frame when a determination is made by the first code segment that the particular object of the current image frame was not occluded in the previous image frame;

a third code segment which determines whether any of the rendered objects of the current image frame are occluded, wherein the third code segment makes the determination once all of the objects of the current image frame that were not occluded in the previous image frame have been rendered by the second code segment;

a fourth code segment which determines whether the particular object of the current image frame was occluded in the previous image frame, wherein the determination is made by the fourth code segment when a determination is made by the third code segment that a particular rendered object of the current image frame is not occluded, and a fifth code segment which determines whether a prediction error has occurred, wherein the fifth code segment determines that a prediction error has occurred when a determination is made by the fourth code segment that the particular rendered object of the current image frame was occluded in the previous image frame.

13. The program of claim 12, further comprising a sixth code segment, wherein when a determination is made by the fifth code segment that a prediction error has occurred, the sixth code segment renders the particular object to the frame buffer to correct the error, and wherein the third code segment determines whether any rendered objects in the current image frame are occluded by performing an occlusion test on each of the objects in the current image frame, wherein when a determination is made by the third code segment during the occlusion test that an object in the current image frame is occluded, the third code segment marks the occluded object with a first indicator indicating that the marked object is occluded.

14. The computer program of claim 13, wherein the fourth code segment determines whether the particular object of the current image frame was occluded in the previous image frame by determining whether the object is marked with the first indicator.

15. The computer program of claim 12, further comprising a sixth code segment, wherein when a determination is made by the fifth code segment that a prediction error has occurred, the sixth code segment renders the particular object to the frame buffer to correct the error, and wherein the third code segment determines whether any objects in the current image frame that have been rendered are occluded by performing an occlusion test on each of the objects in the current image frame, wherein when a determination is made by the third code segment during the occlusion test that an object in the current image frame is occluded, the third code segment marks the occluded object with a first indicator indicating that the marked object is occluded, and wherein the fourth code segment determines whether the particular object of the current image frame was occluded in the previous image frame by determining whether the object is marked with the first indicator, and wherein when a determination is made by the fourth code segment that a particular object that is not occluded in the current image frame has been marked with the first indicator, then the sixth code segment marks the object with a second indicator indicating that the object is visible and tags the object with a tag indicating that the object is to be rendered to the frame buffer, wherein each tagged object corresponds to the occurrence of a prediction error.

16. The computer program of claim 15, wherein once all of the objects of the current image frame have been occlusion tested, all of the tagged objects are rendered to the frame buffer.

17. A computer graphics display system, comprising:
means for buffering a plurality of image frames;
means for identifying a plurality of objects in a current image frame;
means for determining whether each of the plurality of identified objects were occluded in a preceding image frame adjacent to the current image frame;
means for rendering each of the plurality of identified objects when the object was not occluded in the previous image frame; and
means for occlusion testing rendered objects of the current image frame, wherein when a rendered object is not occluded, and wherein the rendered object was occluded in the previous image frame a prediction error is generated.

18. The system of claim 17, wherein the occlusion testing means marks the occluded objects of the current image frame with a first indicator.

19. The system of claim 18, wherein objects not occluded in the current frame previously marked with the first indicator are marked with a second indicator.

20. The system of claim 18, wherein objects marked with the second indicator are rendered to said means for buffering.

21. The system of claim 18, wherein the occlusion testing means determines whether objects in the current frame are occluded.

22. The system of claim 18, wherein the occlusion testing means determines whether objects in the current frame include the first indicator.

23. The system of claim 18, wherein the occlusion testing means determines whether objects in the current frame include the second indicator.

24. The system of claim 18, wherein the occlusion testing means comprises hardware.

25. The system of claim 18, wherein the occlusion testing means comprises software.

26. The system of claim 18, wherein the occlusion testing means determines whether objects are occluded in the hardware.

27. The system of claim 18, further comprising:
means for marking each object that initiated a prediction error as visible; and
means for rendering each object in the current image frame marked as visible.

28. The system of claim 27, wherein once all the objects of the current image frame have been occlusion tested, the rendering means for visible objects forwards the visible objects to said means for buffering.

29. The system of claim 28, wherein the occlusion testing means comprises both hardware and software, and wherein occlusion determinations are performed in the hardware.

30. A method for occlusion testing, comprising the steps of:
identifying each object in a current image frame;
determining whether each identified object was occluded in the immediately preceding image frame to the current image frame;
forwarding each identified object that was not occluded in the preceding image frame to a frame buffer;
determining whether each forwarded object in the frame buffer is occluded in the current image frame;
determining whether each non-occluded object of the current image that was previously forwarded to the frame buffer was occluded in the preceding image frame; and
generating a prediction error for each object of the current frame that was previously forwarded to the frame buffer that was occluded in the preceding image frame.

31. The method of claim 30, further comprising:
rendering objects associated with a prediction error to the frame buffer to correct the error; and
marking occluded objects in the current image frame with a first indicator.

32. The method of claim 31, wherein determining whether each identified object was occluded in the immediately preceding image frame to the current image frame comprises searching for the first indicator.

33. The method of claim 32, further comprising:
marking non-occluded objects in the current image frame with a second indicator; and
rendering each object of the current image frame associated with the second indicator to the frame buffer.

34. A computer program embodied on a computer-readable medium, the computer program, comprising:
a code segment that identifies each object in a current image frame and determines whether each identified object in the current image frame was occluded in the immediately preceding image frame;
a code segment that renders to a frame buffer the non-occluded objects identified by the code segment that identifies;
a code segment that determines whether any of the objects rendered by the code segment that renders are occluded in the current image frame;
a code segment, responsive to the code segment that determines, that ascertains whether non-occluded objects in the current image frame were occluded in the preceding image frame; and
a code segment, responsive to the code segment that ascertains, that associates a prediction error with an object when the code segment that ascertains indicates that a non-occluded previously rendered object in the current image frame was occluded in the current image frame.

35. The program of claim 34, further comprising:
a code segment, responsive to the prediction error, that renders the object to the frame buffer and wherein the code segment that determines marks occluded objects with a first indicator.

36. The program of claim 35, wherein the code segment that ascertains is responsive to the first indicator.

37. The program of claim 34, further comprising:
a code segment, responsive to the prediction error, wherein the code segment that determines marks occluded objects with a first indicator, wherein the code segment that ascertains is responsive to the first indicator, that marks non-occluded objects with a second indicator.

38. The program of claim 37, wherein once all objects of the current image frame have been occlusion tested, all objects marked with the second indicator are rendered to the frame buffer.

* * * * *